United States Patent [19]
Takiguchi

[11] Patent Number: 5,913,748
[45] Date of Patent: Jun. 22, 1999

[54] DOWNSHIFT CONTROL DEVICE FOR AUTOMATIC TRANSMISSION

[75] Inventor: Masahiro Takiguchi, Fuji, Japan

[73] Assignee: Jatco Corporation, Japan

[21] Appl. No.: 08/756,978

[22] Filed: Nov. 26, 1996

[30] Foreign Application Priority Data

Nov. 29, 1995 [JP] Japan ................................. 7-310340

[51] Int. Cl.⁶ ............................................ F16H 61/08
[52] U.S. Cl. ...................... 477/148; 477/146; 477/151
[58] Field of Search ............................... 477/151, 152, 477/146, 145, 144, 148, 149, 154

[56] References Cited

U.S. PATENT DOCUMENTS

| | | | |
|---|---|---|---|
| 4,653,351 | 3/1987 | Downs et al. | 477/148 |
| 4,854,195 | 8/1989 | Moroto et al. | 477/151 |
| 5,070,747 | 12/1991 | Lentz et al. | 477/144 X |
| 5,079,970 | 1/1992 | Butts et al. | 477/120 X |
| 5,113,343 | 5/1992 | Hunter et al. | 477/148 X |
| 5,168,777 | 12/1992 | Isono et al. | 477/152 |
| 5,401,219 | 3/1995 | Kimura et al. | 477/149 X |
| 5,443,427 | 8/1995 | Ataka et al. | 477/148 X |
| 5,634,869 | 6/1997 | Mikami et al. | 477/154 |

Primary Examiner—Charles A Marmor
Assistant Examiner—Scott Luno
Attorney, Agent, or Firm—Rossi & Associates

[57] ABSTRACT

A downshift control device for an automatic transmission is provided in which the transmission is shifted down by releasing an oil pressure from a first engaging element that has been engaged while applying an oil pressure to a second engaging element that has been released. This downshift control device determines whether a downshift command is generated to shift down the transmission while an accelerator pedal is being depressed, and detects a gear ratio that changes during the pedal-depressed downshift control. First control actuator controls the back pressure of a first accumulator provided in an oil path leading to the first engaging element, and second control actuator controls back pressure of a second accumulator provided in an oil path leading to the second engaging element. The present control device outputs to the first control actuator a command to increase the back pressure in a later period of shifting that starts when the detected gear ratio reaches a first predetermined gear ratio, and a command to reduce the back pressure in a terminal period of shifting that follows the later period of shifting. The control device also outputs to the second control actuator a command to reduce the back pressure until when the detected gear ratio reaches a second predetermined gear ratio that is larger than the first predetermined gear ratio and is obtained just before completion of shifting, and a command to increase the back pressure after a point of time when the detected gear ratio reaches the second predetermined gear ratio.

2 Claims, 8 Drawing Sheets

|  | REV/C | HIGH/C | 2-4/B | LOW/C | L&R/B | LOW O.W.C |
|---|---|---|---|---|---|---|
| 1st |  |  |  | ◯ | ◌ | ◍ |
| 2nd |  |  | ◯ | ◯ |  |  |
| 3rd |  | ◯ |  | ◯ |  |  |
| 4th |  | ◯ | ◯ |  |  |  |
| Rev | ◯ |  |  |  | ◯ |  |

| SOLENOID / GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (DRAIN CLOSED)
× ··· OFF (DRAIN OPEN)

DOWNSHIFT CONTROL DEVICE FOR AUTOMATIC TRANSMISSION

BACKGROUND OF THE INVENTION

1. Field of the Invention

The present invention relates to a downshift control device for an automatic transmission of a motor vehicle, and more particularly to a technique for controlling pressures applied to and released from engaging elements by controlling back pressures of accumulators in the process of shifting down the transmission while an accelerator pedal is being depressed.

2. Description of the Prior Art

There is known a shift control device for an automatic transmission as disclosed in Japanese laid-open Patent Publication No. 2-80850.

In order to reduce shift shocks during power-on downshifting, the control device disclosed in the above-identified publication is provided with delaying means for delaying engagement of a first input clutch that is to be engaged as a result of downshifting, i.e., means for keeping a small increase in the pressure applied to the first input clutch in a later period of shifting, so as to prevent the first input clutch from being engaged with a transmission torque capacity before first one-way clutch is engaged such that the rotating speed of an input shaft of the transmission matches the gear position in which the transmission is to be placed after the downshifting.

Since the above-described known downshift control device employs the one-way clutch for optimizing the downshift timing in which the input and output shafts of the transmission are rotated in synchronization with each other, pull-in or drawing shocks can be avoided and desirable downshifting can be thus achieved by suitably controlling the pressure to be applied to the clutch during downshifting and reducing the increase in the rotating speed of the input shaft of the transmission. However, in an automatic transmission equipped with a power transmission mechanism in which the one-way clutch is eliminated and the downshift timing of synchronized rotation is controlled by increasing the pressure applied to the clutch, the rotating speed of the input shaft of the transmission cannot be controlled by controlling the pressure applied to the clutch.

In the automatic transmission equipped with the power transmission mechanism in which the one-way clutch is eliminated, therefore, when the clutch pressure to be applied is increased earlier than the synchronization timing (as indicated in ① in FIG. 10), by keeping the engine speed $N_E$ (turbine speed $N_T$) being increased at a high rate (steep slope of increase in the engine speed $N_E$) throughout the downshift operation, the rotation of the input shaft is pulled up and the output torque $T_O$ becomes temporarily negative, resulting in pull-in shocks. These shocks can be reduced where the clutch pressure to be applied is increased around the synchronization timing (as indicated in ② in FIG. 10). Where the clutch pressure to be applied is increased later than the synchronization timing (as indicated in ③ in FIG. 10), however, the rotation of the engine that is racing is pulled down, and the output torque $T_O$ is temporarily raised to a great extent, resulting in thrust shocks.

As described above, where the slope of increase in the engine speed $N_E$ (turbine speed $N_T$), i.e., slope of increase in the gear ratio, largely changes even in a region around the synchronization timing, the clutch pressure to be applied must be increased in the timing that almost corresponds to a point of time or a moment. Where rotating conditions, oil temperature and other conditions slightly differ each time the transmission is shifted down, therefore, the clutch pressure to be applied cannot be always increased in the same timing as the synchronized rotation, and the pull-in shocks or thrust shocks cannot be thus avoided.

SUMMARY OF THE INVENTION

The first object of the present invention is to provide a downshift control device for an automatic transmission wherein the transmission is shifted down to a lower gear position to be established after downshifting by releasing an oil pressure from a first engaging element that has been engaged in a higher gear position established before the downshifting while applying an oil pressure to a second engaging element that has been released in the higher gear position, which control device easily controls accumulator back pressures with quick response and high stability, so as to assure both optimum shift timing achieved by synchronized rotation and good acceleration of vehicle after the shifting.

The second object of the invention is to attain the above first object while assuring torque pressure that inhibits slip of the first engaging element to be released, and inertia pressure that allows sufficient slip of the first engaging element.

The first object may be accomplished according to the principle of the present invention, which provides a downshift control device for an automatic transmission as shown in FIG. 1 wherein the transmission is shifted down to a lower gear position to be established after downshifting by releasing an oil pressure from a first engaging element "a" that has been engaged in a higher gear position established before the downshifting while applying an oil pressure to a second engaging element "b" that has been released in the higher gear position, the downshift control device comprises pedal-depressed downshifting determining means "c" for determining whether a downshift command is generated to shift down the automatic transmission while an accelerator pedal is being depressed; gear ratio detecting means "d" for detecting a gear ratio that changes during pedal-depressed downshift control; a first accumulator "e" provided in an oil path that leads to the first engaging element "a" that is to be released upon downshifting; a first control actuator "f" for controlling an oil pressure in a back pressure chamber of the first accumulator "e"; a second accumulator "g" provided in an oil path that leads to the second engaging element "b" that is to be engaged upon downshifting; a second control actuator "h" for controlling an oil pressure in a back pressure chamber of the second accumulator "g"; downshift released pressure control means "i" for outputting to the first control actuator "f" a command to increase the back pressure of the first accumulator "e" in a later period of shifting, and a command to reduce the back pressure of the first accumulator "e" in a terminal period of shifting, the later period of shifting starting at a point of time when the detected gear ratio reaches a first predetermined gear ratio that is close to a gear ratio obtained after shifting and ending when a predetermined time expires, the terminal period of shifting starting upon a lapse of the predetermined time; and downshift applied engaging pressure control means "j" for outputting to the second control actuator "h" a command to reduce the back pressure of the second accumulator "g" until when the detected gear ratio reaches a second predetermined gear ratio that is larger than the first predetermined gear ratio and is achieved just before completion of shifting, and a command to increase the back pressure of the second accumulator "g" after a point of time when the detected gear ratio reaches the second predetermined gear ratio.

The operation will be hereinafter described.

If the pedal-depressed downshifting determining means "c" determines that a downshift command is generated to shift down the transmission while the accelerator pedal is depressed during running of the vehicle, shift valves or the like are switched so as to release the oil pressure from the first engaging element "a" that has been engaged in the higher gear position before downshifting, and apply the oil pressure to the second engaging element "b" that has been released in the higher gear position, while monitoring the gear ratio to be detected by the gear ratio detecting means "d".

If the detected gear ratio reaches the first predetermined gear ratio that is close to the gear ratio to be achieved after shifting, the downshift released pressure control means "i" outputs to the first control actuator "f" the command to increase the released pressure of the first engaging element "a" that is being reduced due to the increase in the back pressure of the first accumulator "e". Then, if the detected gear ratio reaches the second predetermined gear ratio that is larger than the first predetermined gear ratio and is achieved just before completion of the shifting, the downshift applied pressure control means "j" outputs to the second control actuator "h" the command to increase the back pressure of the second accumulator "g" so as to rapidly increase the pressure applied to the second engaging element "b".

Accordingly, upon pedal-depressed downshifting, the released pressure of the first engaging element "a" that is being reduced by the downshift released pressure control means "i" is increased before performing applied pressure control to cause the downshift applied pressure control means "j" to increase the pressure applied to the second engaging element "b", so as to reduce the slope of increase in the engine speed (turbine speed) (that is equal to the slope of increase in the gear ratio) in the later period of downshifting. When the timing for increasing the pressure to be applied is determined by monitoring the gear ratio, therefore, the timing can be selected from a range that allows some degree of shift in the timing, thereby permitting shifting with synchronized rotation while avoiding pull-in shocks and thrust shocks even where the rotating conditions, oil temperature and other conditions slightly differ each time the downshifting is effected.

Namely, the control of the pressure released from the first engaging element "a" contributes to control of rotation of the input shaft of the transmission, such that the first engaging element "a" that has been almost completely released is lightly engaged again due to the increase in the released pressure in the later period of shifting, so as to temporarily delay the progress of downshifting.

Further, the released pressure of the first engaging element "a" is kept increased for a predetermined period of time, so as to prevent racing of the engine or reduce the speed of the engine that is racing, thereby to avoid an excessive increase in the output torque that occurs upon completion of shifting, which leads to a reduced shock level.

Moreover, in the terminal period of shifting after a predetermined time elapses after the increase of the released pressure, the downshift released pressure control means "i" outputs the command to reduce the back pressure to the first control actuator "f", so that the first engaging element "a" is released again, assuring good acceleration of the vehicle immediately after the shifting operation.

Namely, the first engaging element "a" is released again so as to increase the output torque when the shifting is about to be completed. If the shifting is completed while the released pressure of the first engaging element "a" is kept at the increased level, the output torque cannot be sufficiently increased, resulting in poor acceleration of the vehicle immediately after shifting, and causing shudder due to light engagement of the first engaging element "a".

In the downshift control device for an automatic transmission, the downshift released pressure control means outputs a command to increase the back pressure of the first accumulator to the first control actuator in an initial period of shifting, and outputs a command to reduce the back pressure of the first accumulator to the first control actuator in a middle period of shifting. The initial period of shifting starts when the downshift command is generated and ending when a predetermined time expires or the detected gear ratio starts being changed, and the middle period of shifting follows the initial period of shifting and ends when the detected gear ratio reaches the first predetermined gear ratio.

The operation will be described.

In the initial period of shifting starting when the downshift command is generated and ending when a predetermined time expires or the detected gear ratio starts being changed, the command to increase the back pressure is generated by the downshift releasing control means.

Thus, the above control performed during the initial shifting period ensures an oil pressure (torque pressure) of a level that does not cause slip of the first engaging element "a" to be released, and assures a period of time for allowing stroke of a piston of the second engaging element "b" that is to be engaged.

In the middle period of shifting that follows the initial period of shifting and ends when the detected gear ratio reaches the first predetermined gear ratio, the command to reduce the back pressure is generated by the downshift released pressure control means "i".

The above control performed during the middle shifting period assures an oil pressure (inertia pressure) of a level that allows sufficient slip of the first engaging element "a" to be released, and the gear ratio is increased during this time while maintaining a subtle capacity of the second engaging element "b".

In sum, the command to increase the back pressure generated in the later period of shifting and the command to reduce the back pressure generated in the terminal period of shifting are combined so as to control the first control actuator "f" (or released pressure) in four steps to engage, release, engage and release the first engaging element "a" when the transmission is shifted down while the accelerator pedal is being depressed.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENT

There will be described the first embodiment of the present invention in the form of a downshift control device for an automatic transmission.

Initially, there will be schematically described the whole construction of the automatic transmission in which the downshift control device of the first embodiment is employed.

Figure 1:
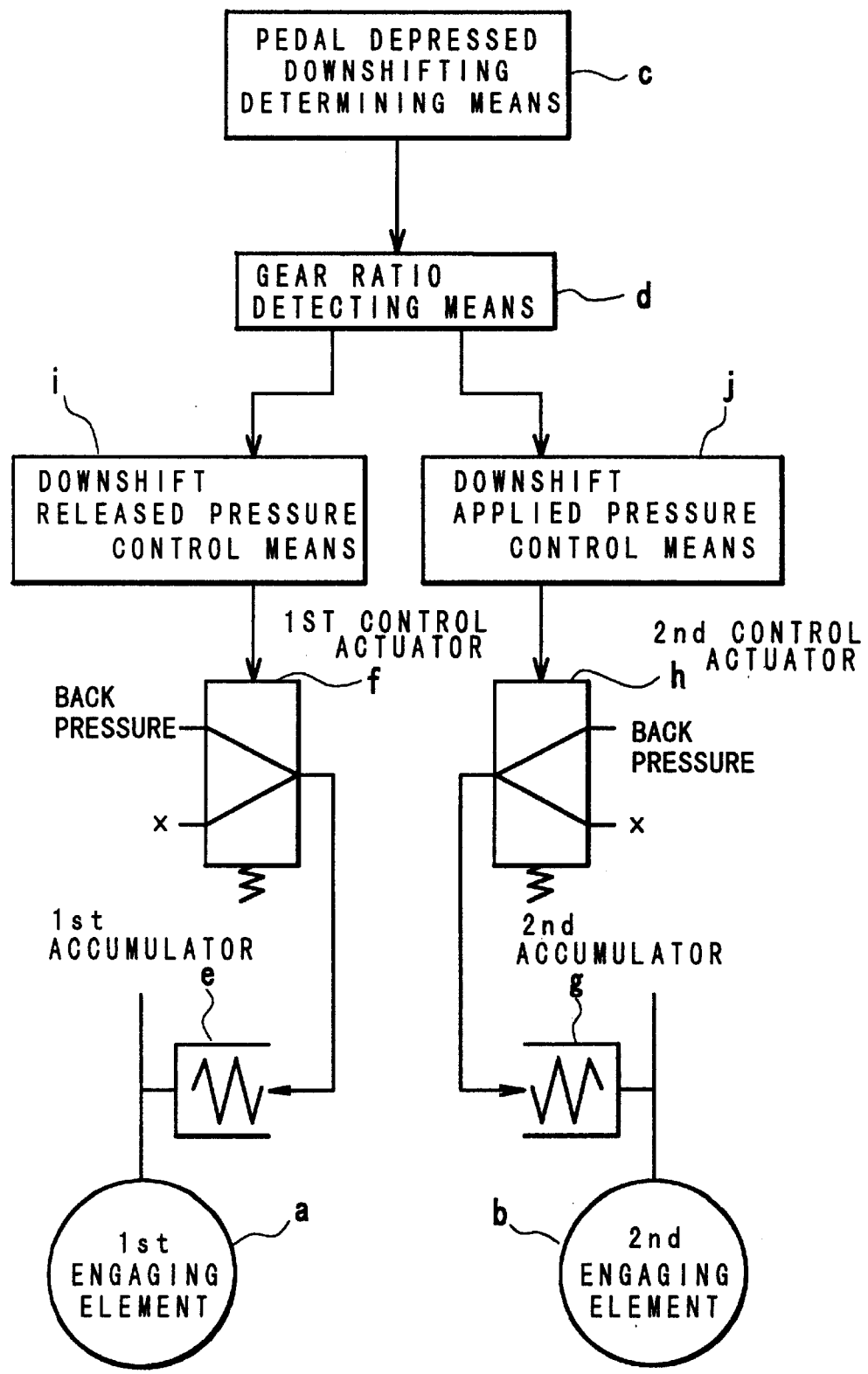
FIG. 1 is a view showing the construction of a downshift control device of an automatic transmission according to the present invention.
Figures 2, 3:
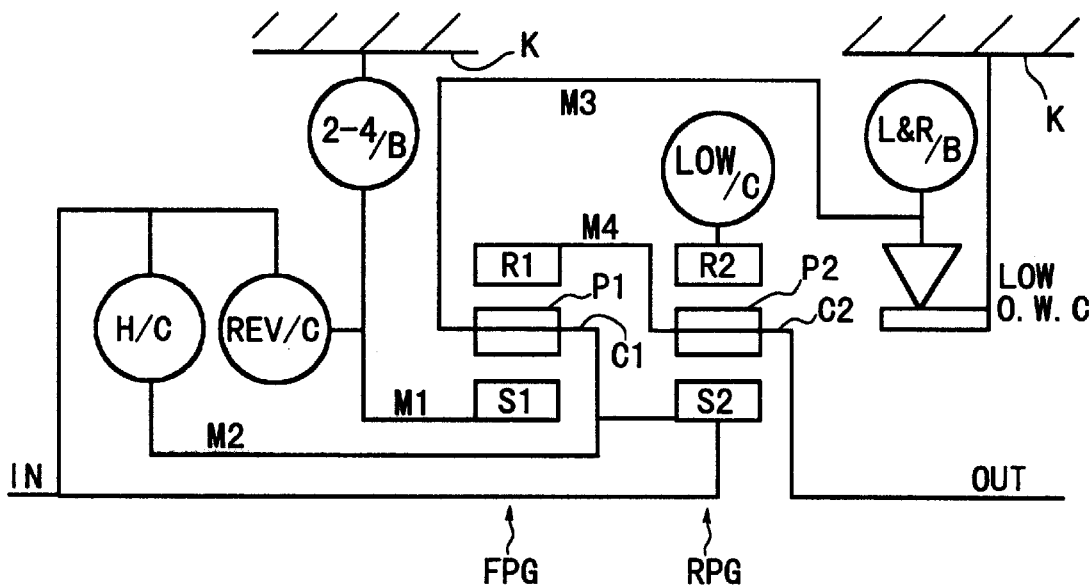
FIG. 2 is a view schematically showing a power transmitting mechanism of the automatic transmission using the hydraulic control device of the first embodiment of the invention.
FIG. 3 is a table showing engaged states of elements of the automatic transmission using the hydraulic control device of the first embodiment.

FIG. 2 is a view schematically showing a power transmitting system of the automatic transmission. In FIG. 2, IN is an input shaft, and OUT is an output shaft, while FPG is a front planetary gear system, and RPG is a rear planetary gear system. The front planetary gear system FPG includes a first sun gear S1, a first ring gear R1, a first pinion P1 and a first pinion carrier C1. The rear planetary gear system RPG includes a second sun gear S2, a second ring gear R2, a second pinion P2 and a second pinion carrier C2.

As engaging elements for establishing forward 4-speed, reverse 1-speed gear positions by using the above-described gear train arrangement, there are provided a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low & reverse brake L&R/B. Further, the first carrier C1 is connected to the second ring gear R2 through the third rotary member M3 and the low clutch L/C. The low one-way clutch LOW O.W.C. is disposed in parallel with the low & reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a clutch that is engaged due to oil pressure and needed for ensuring the effect of engine brakes when the above one-way clutch is employed. Thus, the number of shifting elements is reduced, leading to reduced size and weight of the power transmitting system.

FIG. 3 is a view showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low & reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4/B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second ring gear R2 is connected to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second ring gear R2 is connected to the output shaft OUT, so as to establish the overdrive gear position.

The reverse gear position is established by hydraulically engaging the reverse clutch REV/C and the low & reverse brake L&R/B. In this case, the first and second sun gears S1, S2 are connected to the input shaft IN, and the first sun gear S1 is fixed, while the second carrier C2 is connected to the output shaft OUT.

The 2-4 brake 2-4/B is a multiple-disc brake that is constructed similarly to a multiple-disc clutch.

Figure 4:
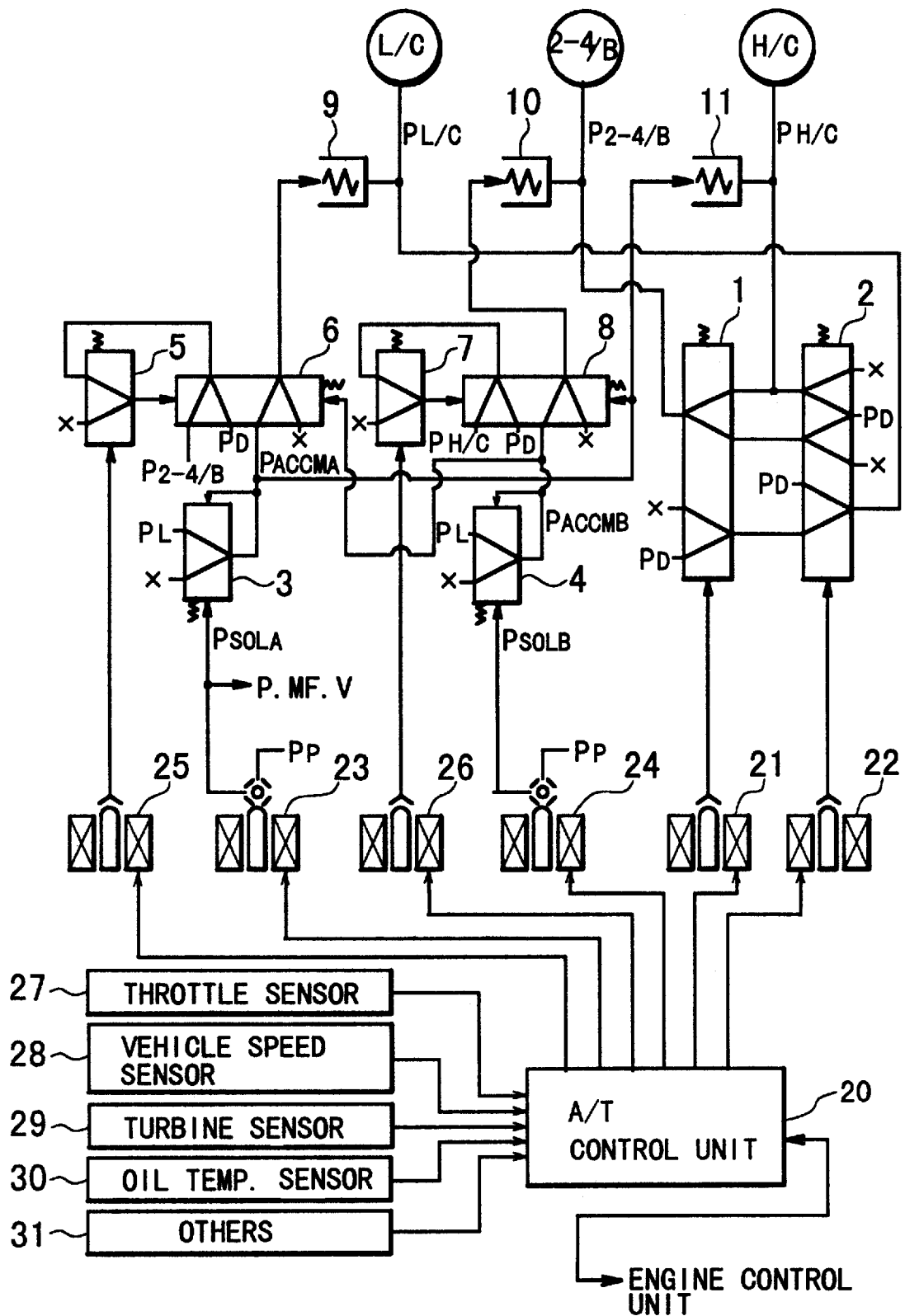
FIG. 4 is a diagram showing the whole control system including a hydraulic control portion and an electronic control portion of the downshift control device of the first embodiment.

FIG. 4 is a control system diagram showing a control valve portion, an electronic control portion, and engaging elements for automatically shifting the transmission to establish one of the above-indicated 1st-speed to 4th-speed gear positions in the D (drive) range. In FIG. 4, the low clutch L/C, 2-4 brake 2-4/B and a high clutch H/C are provided as the engaging elements.

In the control valve portion of FIG. 4, there are provided a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4 brake accumulator 10 and high clutch accumulator 11.

The shift valve (A) 1 and shift valve (B) 2 are adapted to effect switching of oil paths to establish each of the 1st-speed to 4th-speed (overdrive) gear positions according to the operation of a shift solenoid (A) 21 and a shift solenoid (B) 22, respectively.

The accumulator control valve (A) 3 reduces a line pressure $P_L$ depending upon the level of a solenoid pressure $P_{SOLA}$ produced by a line pressure duty solenoid 23, so as to prepare an accumulator control pressure (A) $P_{ACCMA}$. The solenoid pressure $P_{SOLA}$ produced by the line pressure duty solenoid 23 is also led to a pressure modifier valve adapted to prepare a modifier pressure that serves as a signal pressure for the line pressure $P_L$ produced by a pressure regulator valve (not shown).

The accumulator control valve (B) 4 reduces the line pressure $P_L$ depending upon the level of a solenoid pressure $P_{SOLB}$ produced by a 2-4/B duty solenoid 24, so as to prepare an accumulator control pressure (B) $P_{ACCMB}$.

The low clutch timing valve 5 is a switch valve that drains a signal pressure oil path when a low clutch timing solenoid 25 is OFF, and produces the oil pressure for communication of the signal pressure oil path when the solenoid 25 is ON.

The low clutch sequence valve 6 is adapted to control the back pressure of the low clutch accumulator 9 upon shifting-up to the $4^{th}$-speed gear position or shifting-down from the $4^{th}$-speed gear position.

The 2-4 brake timing valve 7 is a switch valve that drains the signal pressure oil path when a 2-4 brake timing solenoid 26 is OFF, and produces the oil pressure for communication of the signal pressure oil path when the solenoid 26 is ON.

The 2-4 brake sequence valve 8 is adapted to control the back pressure of the 2-4 brake accumulator 10 upon shifting-up to the $3^{rd}$-speed gear position or shifting-down from the $3^{rd}$-speed gear position.

The low clutch accumulator 9 has a back pressure chamber to which the accumulator control pressure (A) $P_{ACCMA}$ is applied through the low clutch sequence valve 6, so as to smoothly engage and release the low clutch L/C. The 2-4 brake accumulator 10 has a back pressure chamber to which the accumulator control pressure (B) $P_{ACCMB}$ is applied through the 2-4 brake sequence valve 8, so as to smoothly engage and release the 2-4 brake 2-4/B. The high clutch accumulator 11 has a back pressure chamber to which the accumulator control pressure (A) $P_{ACCMA}$ is applied as it is, so as to smoothly engage and release the high clutch H/C.

The electronic control portion of FIG. 4 includes shift solenoid (A) 21, shift solenoid (B) 22, line pressure duty solenoid 23, 2-4/B duty solenoid 24, low clutch timing solenoid 25 and 2-4/B timing solenoid 26, as actuators for controlling oil pressures according to drive commands generated by an A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, oil temperature sensor 30 for detecting the oil temperature, and other sensors and switches 31.

Figures 5, 6:
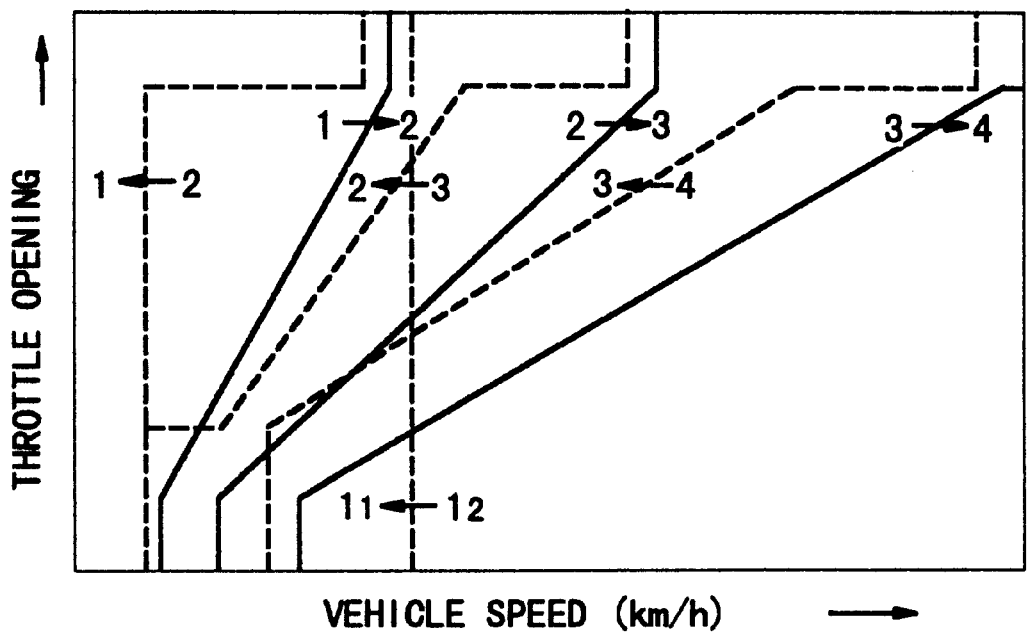
FIG. 5 is a table showing operated states of shift solenoids of the hydraulic control device of the first embodiment.
FIG. 6 is a graph showing one example of gear change point characteristics employed by the hydraulic control device of the first embodiment.

To perform shift control for automatically shifting the transmission from one of the $1^{st}$-speed to $4^{th}$-speed gear positions to another in the D (drive) range, a gear change command is first generated based on the graph of FIG. 6 indicating gear change points in relation to the detected throttle opening and vehicle speed, when the current point (relationship between the throttle opening and vehicle speed) on the graph passes one of upshifting and downshifting lines, and the gear position to which the transmission should be shifted is determined by this gear change command. To establish the thus determined gear position, the A/T control unit 20 generates ON- or OFF-command to the shift solenoid (A) 21 and shift solenoid (B) 22 according to the table of FIG. 5 indicating operations of the shift solenoids.

There will be next explained the operation of the present embodiment.

Electronic Control Operation upon 4-3 Pedal-depressed Downshifting

Figure 7:
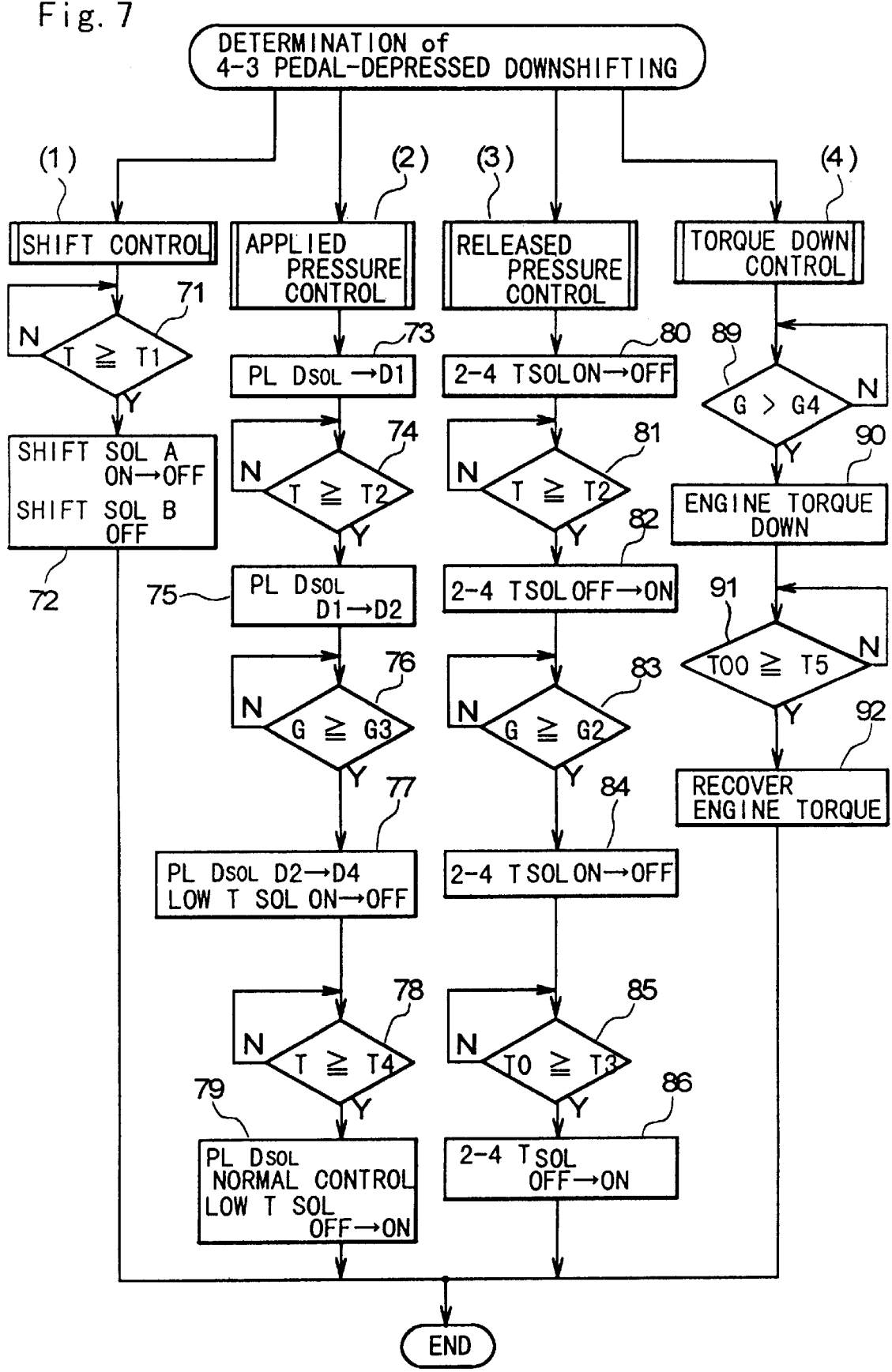
FIG. 7 is a flow chart showing the flow of 4th-speed to 3rd-speed pedal-depressed downshift control performed by an A/T control unit of the first embodiment.
Figure 8:
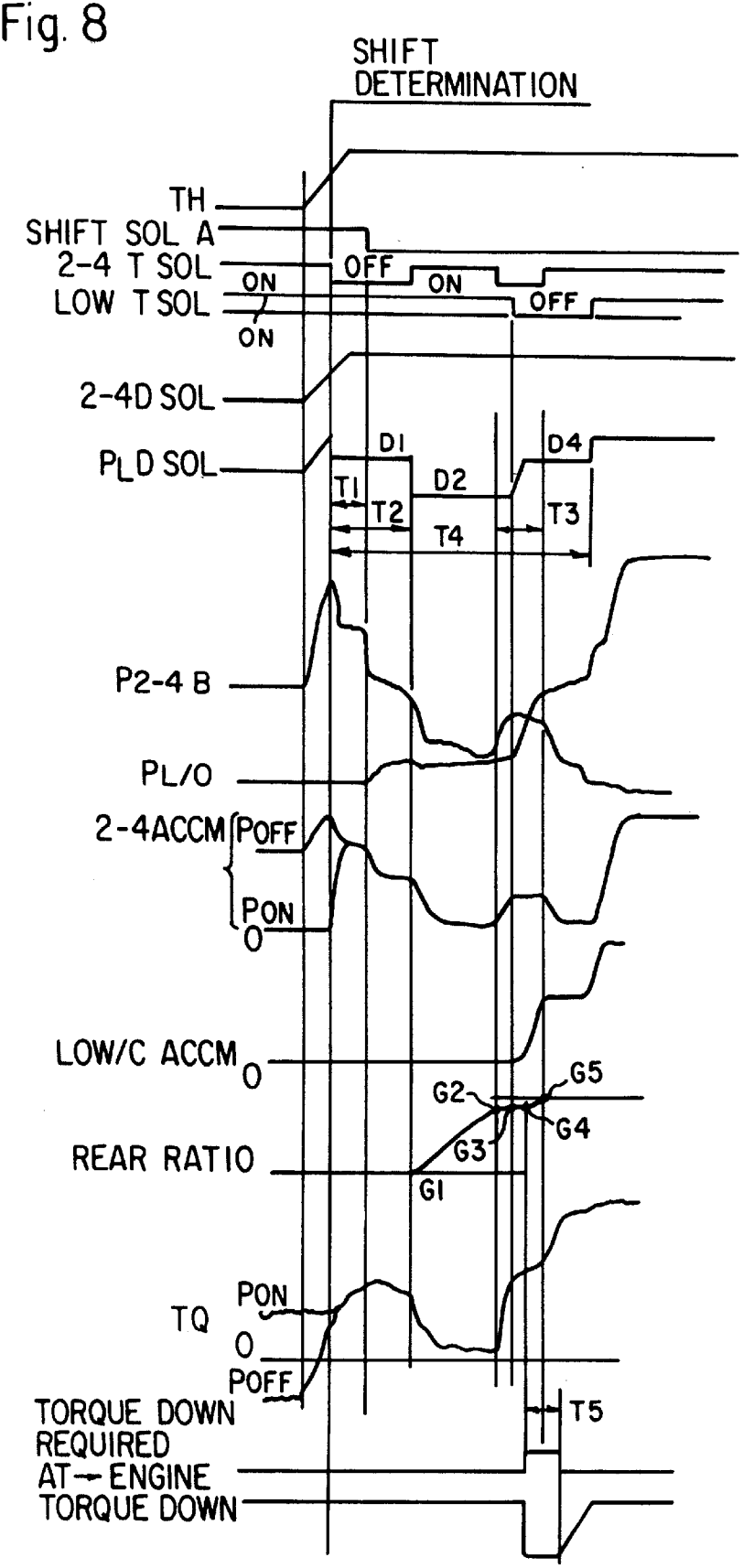
FIG. 8 is a time chart showing respective transient characteristics of control commands, oil pressure, gear ratio, torque and others during the 4th-speed to 3rd-speed pedal-depressed downshift operation of the first embodiment.

FIG. 7 is a flow chart showing the flow of the downshift control performed by the A/T control unit 20 when the transmission is shifted down from the 4th-speed to 3rd-speed gear position while an accelerator pedal is depressed, in which control the 2-4 brake 2-4/B (corresponding to the first engaging element a) is released and the low clutch L/C (corresponding to the second engaging element "b") is engaged. FIG. 8 is a time chart showing transient characteristics of control command, oil pressures, gear ratio, torque and others during the 4-3 pedal-depressed downshifting.

Initially, as shown in FIG. 7, it is determined whether the transmission is being shifted down from the 4th-speed to 3rd-speed position while the accelerator pedal is being depressed. An affirmative decision is obtained in this step if two conditions are satisfied, that is, the current point (relationship between the throttle opening and the vehicle speed) on the graph of FIG. 6 indicating gear change points passes the 4-3 downshifting line and a 4-3 downshift command is generated, and the throttle opening is being increased. In this connection, the increase of the throttle opening is determined by calculating a differential value dTH of a detected value TH of the throttle opening received from the throttle sensor 27, and determining whether the obtained differential value dTH is larger than zero.

If it is determined that the transmission is shifted down from the 4th-speed to 3rd-speed gear position with the accelerator pedal being depressed, shift control (1), applied pressure control (2), released pressure control (3) and torque down control (4) are implemented independently of each other. If a command for the 4-3 pedal-depressed downshifting is generated, a timer value T representing the time elapsed after generation of the pedal-depressed 4th- to 3rd-speed downshift command starts being increased, and arithmetic processing is performed as needed to determine the actual gear ratio G that is the ratio of the turbine speed (rotating speed of the input shaft of the transmission) to the vehicle speed (rotating speed of the output shaft of the transmission), so as to observe changes in the gear ratio from the time when the pedal-depressed 4th- to 3rd-speed downshift command is generated.

(1) Shift Control

In step 71, it is determined whether the timer value T is equal to or larger than a first predetermined timer value T1. If an affirmative decision is obtained in step 71, step 72 is executed to switch a command to the shift solenoid (A) 21 from ON to OFF, and keep generating an OFF command to the shift solenoid (B) 22.

(2) Applied Pressure Control

In controlling the pressure to be applied to the low clutch L/C, the line pressure duty solenoid 23 and low-clutch timing solenoid 25 (corresponding to the second control actuator "h") serve as control actuators.

In step 73, duty ratio D1 is generated as a command to the line pressure duty solenoid 23 at the same time that the shift command is generated. In step 74, it is determined whether the timer value T is equal to or larger than a second predetermined timer value T2. If an affirmative decision is obtained in step 74, step 75 is then executed to generate a command to rapidly reduce the duty ratio from D1 to D2 and give the reduced duty ratio D2 to the line pressure duty solenoid 23.

In step 76, it is determined whether the actual gear ratio G is equal to or larger than a third predetermined gear ratio G3. If an affirmative decision is obtained in step 76, step 77 is then executed to generate a command to gradually increase the duty ratio from D2 to D4 and give the increased duty ratio D4 to the line pressure duty solenoid 23. At the same time, an OFF command, instead of an ON command, is outputted to the low clutch timing solenoid 25.

In step 78, it is determined whether the timer value T is equal to or larger than a fourth predetermined timer value T4 (that indicates the time when the shifting operation is completed). In step 79, normal control is resumed in which a command corresponding to the degree of the throttle opening TH is given to the line pressure duty solenoid 23, while ON command is outputted to the low clutch timing solenoid 25.

(3) Released Pressure Control

In controlling the pressure released from the 2-4 brake 2-4/B, the 2-4/B timing solenoid 26 (corresponding to the first control actuator "f") serves as a control actuator. On the other hand, the 2-4/B duty solenoid 24 is controlled by changing its duty ratio depending upon the degree of the throttle opening TH irrespective of the shifting operation, so as to produce the accumulator control pressure (B) $P_{ACCMB}$ that varies depending upon the throttle opening.

In step 80, the ON command that has been outputted to the 2-4/B timing solenoid is switched to or replaced by an OFF command at the same time that the downshift command is generated. In step 81, it is determined whether the timer value T is equal to or larger than the predetermined second timer value T2. If an affirmative decision is obtained in step 81, the OFF command that has been outputted to the 2-4/B timing solenoid 26 is switched to or replaced by an ON command.

In step 83, it is determined whether the actual gear ratio G is equal to or larger than a second predetermined gear ratio G2 (<G3) or not. If an affirmative decision is obtained in step 83, step 84 is executed to output an OFF command, instead of the ON command, to the 2-4/B timing solenoid 26. In step 85, it is determined whether the timer value T0 that starts being counted at the point of time when the actual gear ratio G reaches the second predetermined gear ratio G2 is equal to or larger than the third predetermined timer value T3. If an affirmative decision is obtained in step 85, step 86 is then executed to output an ON command, instead of the OFF command, to the 2-4B timing solenoid 26.

(4) Torque Down Control

In step 89, it is determined whether the actual gear ratio G is equal to or larger than a fourth predetermined gear ratio G4 (>G3) or not. If an affirmative decision is obtained in step 89, the A/T control unit 20 requires an engine control unit to reduce the engine torque by cutting the fuel or retarding ignition timing, for example.

In step 91, the timer value T00 that starts being counted at the point of time when the actual gear ratio G reaches the fourth predetermined gear ratio G4 is equal to or larger than a fifth predetermined timer value T5. If an affirmative decision (YES) is obtained in step 91, step 92 is executed to recover or resume the engine torque to a normal level.

Shift Control Operation

The shift control as described above is characterized in that the shift valve is not actuated to initiate the shifting operation at the same time that the downshift command is generated, but the shifting is initiated upon a lapse of delay time that is a duration between the time when the downshift command is generated and the time when the first predetermined timer value T1 is reached.

Figure 9:
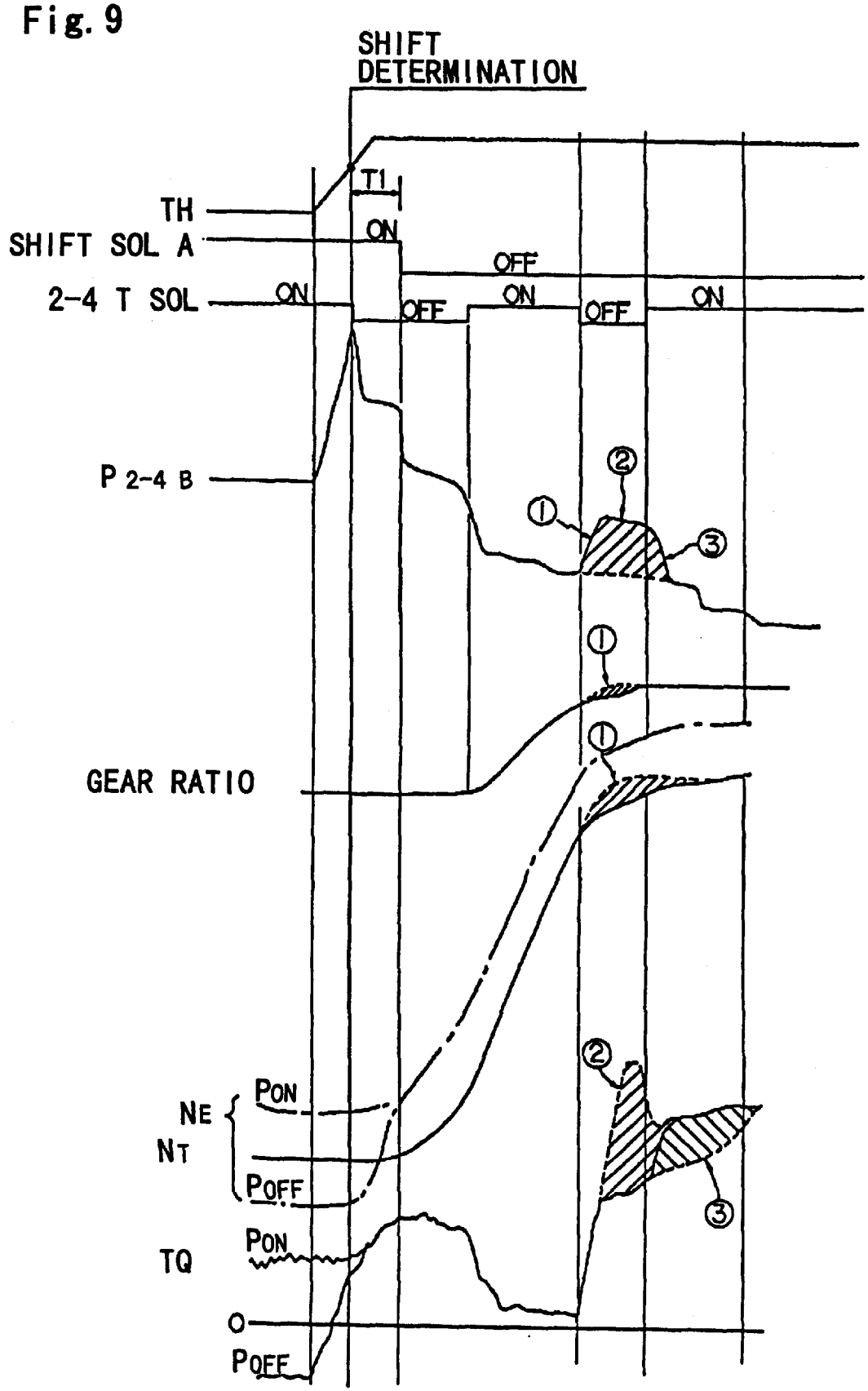
FIG. 9 is a time chart showing respective transient characteristics of oil pressure, gear ratio, torque and others, for explaining the operation and effects of the released pressure control conducted in the first embodiment.
Figure 10:
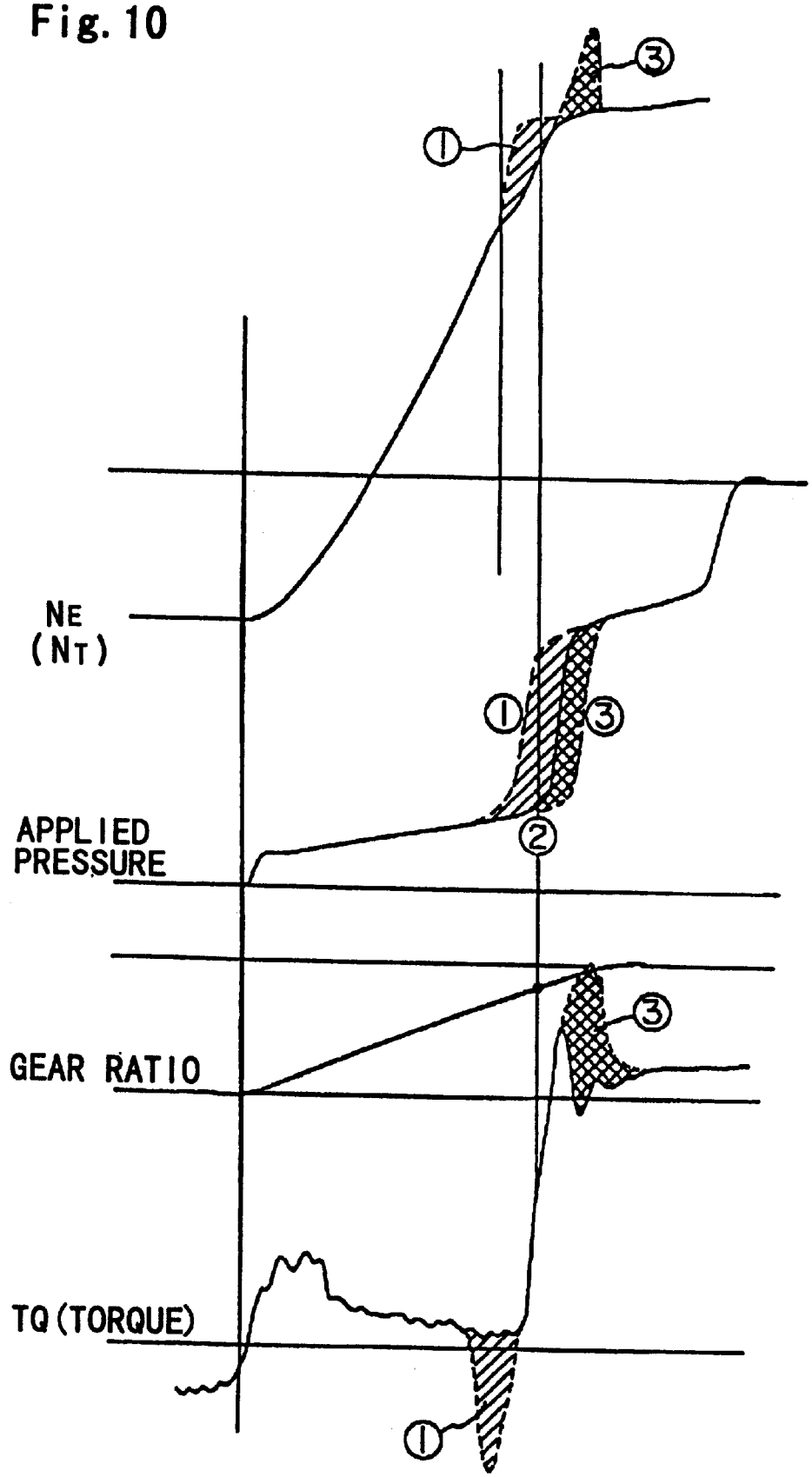
FIG. 10 is a time chart explaining control of the timing in which the applied pressure is increased by monitoring the gear ratio in a conventional pedal-depressed downshift control device.

Accordingly, as shown in FIG. 9, the engine speed $N_E$ is increased with the accelerator pedal depressed during the delay time corresponding to the first predetermined timer value T1 counted from generation of the downshift command, and, when the shifting operation is actually started by generating the ON command to the shift solenoid (A) 21 to turn on the solenoid (A) 21, the engine speed has been increased so that the shifting can be always started in the power-on condition no matter whether the vehicle is in the power-off state or power-on state before the transmission is shifted down from the 4th-speed to 3rd-speed gear position from the power-off condition or power-on condition.

As a result, the shifting operation can be terminated in almost the same timing irrespective of whether the vehicle is in the power-on or power-off state before generation of the downshift command, thus eliminating a need to set two different modes, i.e., one mode for 4-3 pedal-depressed downshifting from the power-off state, and the other mode for 4-3 pedal-depressed downshifting from the power-on state, when controlling transient oil pressures in the transmission system. Namely, the same control can be performed for controlling the transient oil pressure during shifting no matter whether the vehicle is in the power-on or power-off state before the downshift command (gear change command) is generated.

Transient Oil Pressure Control during Shifting

When it is determined while the vehicle is running that the transmission is being shifted down from the 4th-speed to 3rd-speed gear position while the accelerator pedal is being depressed, the shift valve (A) 21 is switched thereby to release the oil pressure from the 2-4 brake 2-4/B that has been engaged in the 4th-speed gear position, and applying the oil pressure to low-clutch L/C that has been released in the 4th-speed gear position. In this oil pressure control, the pressure applied to the low clutch L/C is controlled by controlling the line pressure duty solenoid 23 and low clutch timing solenoid 25, and the pressure released from the 2-4 brake 2-4/B is controlled by controlling the 2-4B timing solenoid 26. Thus, the pressure applied to the lower clutch L/C and the pressure released from the 2-4 brake 2-4/B are controlled independently of each other. There will be hereinafter described characteristics of the transient oil pressure control during shifting.

(1) The first characteristic is that in controlling the pressure released from the 2-4 brake 2-4/B, the back pressure of the 2-4 brake accumulator 10 provided in the oil path leading to the 2-4 brake 2-4/B is controlled by controlling the ON/OFF state of the 2-4/B timing solenoid 26.

Namely, as a method for controlling the released pressure of the 2-4 brake 2-4/B, the oil pressure released from the 2-4 brake 2-4/B may be directly controlled. In this case, however, the pressure control is greatly affected by the flow rate in oil chambers and oil paths, and thus suffers from lack of stability. Where the back pressure of the 2-4 brake accumulator 10 provided in the oil path leading to the 2-4 brake 2-4/B is controlled so as to provide shelf-pressure characteristics, on the other hand, the engaging pressure applied to the 2-4 brake 2-4/B is immediately varied by varying the accumulator back pressure, thus assuring quick response and high stability.

Further, while the accumulator pressure can be continuously controlled using the 2-4/B duty solenoid 24, it is easier to conduct ON/OFF control with respect to the 2-4/B timing solenoid 26 to control the accumulator pressure, rather than subtly varying the duty ratio of the duty solenoid 24.

(2) The second characteristic is that the pressure released from the 2-4 brake 2-4/B is controlled in four stages when the transmission is shifted down from the 4th-speed to 3rd-speed gear position while the accelerator pedal is being depressed.

First Stage

In the initial period of shifting starting with generation of the downshift command and ending with expiration of the second predetermined timer value T2, an OFF command is generated to the 2-4/B timing solenoid 26, namely, a command is generated to supply the back pressure to the 2-4 brake accumulator 10.

The above control performed in the initial shifting period ensures an oil pressure (torque pressure) having a sufficient level that does not cause slip of the 2-4 brake 2-4/B that is to be released, and provides sufficient time for stroke of a piston of the low clutch L/C that is to be engaged.

Second Stage

In the middle period of shifting following the above-described initial shifting period and ending when the actual gear ratio G reaches the second predetermined gear ratio G2, an ON command is generated to the 2-4/B timing solenoid 26, namely, a command is generated to eliminate or discharge the back pressure of the 2-4 brake accumulator 10.

In the middle shifting period, therefore, a low oil pressure (inertia pressure) is ensured that permits sufficient slip of the 2-4 brake 2-4/B that is to be released, and the actual gear ratio G is increased during this time while maintaining a subtle capacity of the low clutch L/C.

Third Stage

In the later period of shifting starting at the point of time when the actual gear ratio reaches the second predetermined gear ratio G2 and ending with expiration of the third predetermined timer value T3, an OFF command is generated to the 2-4/B timing solenoid 26, namely, a command is generated to supply the back pressure again to the 2-4 brake accumulator 10.

The above control performed in the later period of shifting ensures appropriate timing for increasing the pressure applied to the low clutch L/C that is to be engaged.

Namely, the pressure released from the 2-4 brake 2-4/B is increased (as indicated in ① in FIG. 9) so that the slope of increase in the turbine speed $N_t$ (=slope of increase in the gear ratio) is reduced (as indicated by hatched area ① in the gear ratio and turbine speed characteristics in FIG. 9) in the later period of the 4-3 pedal-depressed downshifting, and the pressure to be applied to the low clutch L/C can be increased in appropriate timing that is determined by monitoring the gear ratio such that the timing can be selected within a region that allows more or less fluctuation of the timing. Thus, even in the case of downshifting where rotating conditions and oil-temperature slightly differ in each shifting operation, the synchronized rotation of the input and output shafts of the transmission occurs upon shifting, without causing pull-in shocks or thrust shocks.

In other words, the above control of the pressure released from the 2-4 brake 2-4/B contributes to controlling the rotation of the transmission input shaft so as to make it easier to determine the timing in which the pressure applied to the low-clutch L/C is increased. With an increase in the released pressure in the later period of shifting, the 2-4 brake 2-4/B that has been almost completely released is lightly engaged again, so as to temporarily delay the process of downshifting.

Since the light engagement of the 2-4 brake 2-4/B is kept for a period of time corresponding to the third predetermined timer value T3 (as indicated by ② in FIG. 9), the engine is prevented from racing as in the case where the 2-4 brake 2-4B is released without being lightly engaged again during the 4-3 pedal-depressed downshifting. By pulling down the rotation of the racing engine, an excessive increase in the output torque TQ that appears upon completion of the shifting is eliminated (as indicated in the hatched area ② of the output torque characteristic of FIG. 9), and the shock level that is determined by a fall of the output torque TQ can be reduced to be sufficiently small.

Fourth Stage

In the terminal period of shifting after lapse of a predetermined time that corresponds to the third predetermined timer value T3, an ON command is generated to the 2-4/B timing solenoid 26, namely, a command is generated to eliminate or discharge again the back pressure of the 2-4 brake accumulator 10.

More specifically, if the shifting operation is terminated with the releasing pressure of the 2-4 brake 2-4/B having been increased, the increase of the output torque TQ is excessively reduced due to the engagement of the 2-4 brake 2-4/B (as indicated by hatched area ③ of output torque characteristic), resulting in poor acceleration immediately after the shifting, and causing judder due to light engagement of the 2-4 brake 2-4/B.

Torque Down Control Operation

In the later period of the 4-3 pedal-depressed downshifting in which the output torque TQ is greatly increased, the torque down control is implemented to temporarily reduce the engine torque by cutting the fuel, for example.

With the torque down control for reducing the engine torque performed along with other controls for the 4-3 pedal-depressed downshifting, a variation in the output torque TQ can be reduced, assuring reduced shift shocks and high shifting quality.

There will be explained the effects of the present embodiment.

(1) In the later shifting period starting at the point of time when the actual gear ratio reaches the second predetermined gear ratio G2 and ending upon expiration of the third predetermined timer value T3, the pressure released from the 2-4 brake 2-4/B is controlled by generating the OFF command to the 2-4/B timing solenoid 26, that is, generating the command to supply the back pressure to the 2-4 brake accumulator 10. In the terminal shifting period after lapse of the time determined by the third predetermined timer value T3, the pressure released from the 2-4 brake 2-4/B is controlled by generating the ON command to the 2-4/B timing solenoid 26, that is, generating the command to eliminating again the back pressure of the 2-4 brake accumulator 10. When the actual gear ratio reaches the third predetermined gear ratio G3, the pressure applied to the low clutch L/C is controlled by generating the OFF command to the low clutch timing solenoid 25, that is, generating the command to supply the back pressure to the low clutch accumulator 9. With the present control device constructed to perform these controls, the back pressure of the accumulator can be easily controlled assuring quick response and high stability, and optimum shift timing can be achieved upon synchronized rotation of the input and output shafts of the transmission while assuring desired acceleration of the vehicle after the shifting.

(2) In the initial shifting stage starting with generation of the downshift command and ending with expiration of the second predetermined timer value T2, the pressure released from the 2-4 brake 2-4/B is controlled by generating the OFF command to the 2-4/B timing solenoid 26, namely, generating the command to supply the back pressure to the 2-4 brake accumulator 10. In the middle shifting period following the initial shift period and ending when the actual gear ratio G reaches the second predetermined gear ratio G2, the pressure released from the 2-4 brake 2-4/B is controlled by generating the ON command to the 2-4/B timing solenoid 26, namely, by generating the command to discharge the back pressure of the 2-4 brake accumulator 10. The present control device constructed to perform these controls provides the torque pressure that prevents slip of the 2-4 brake 2-4/B to be released, and the inertial pressure that permits sufficient slip of the 2-4 brake 2-4/B.

Other Embodiments of the Invention

While the 4th-speed to 3rd-speed pedal-depressed downshifting has been described by way of example in the illustrated embodiment, the downshift control according to the present invention is also applicable to 3rd-speed to 2nd-speed and 4th-speed to 2nd-speed pedal-depressed downshifting, and to 5th-speed to 4th-speed downshifting and 5th-speed to 3rd-speed downshifting when the automatic transmission has five gear positions.

While the 2-4/B timing solenoid 26 and the low clutch timing solenoid 25 are respectively used as the first control actuator f and the second control actuator h, and the ON/OFF states of these solenoids 26, 25 are controlled so as to supply or discharge the accumulator pressure in the illustrated embodiment, the back pressure can be directly increased or reduced by means of the 2-4/B duty solenoid 24 and the line pressure duty solenoid 23.

While two duty solenoids, i.e., the line pressure duty solenoid 23 and the 2-4/B duty solenoid 24, are used in the system of the illustrated embodiment, the present invention may be also applied to a system that is only provided with the line pressure duty solenoid provided the system uses two timing solenoids for controlling the pressure applied to one engaging element and the pressure released from another engaging element, respectively.

While the first predetermined timer value T1 is given as a fixed value in the illustrated embodiment, a variable delay time may be set that varies depending upon the throttle opening, mass of intake air of the engine, basic pulse width of fuel injection, vehicle speed, type of downshifting or level of oil temperature. The variable delay time may be also set depending upon two or more of parameters including the vehicle speed, throttle opening, mass of intake air of the engine, basic pulse width of fuel injection, type of downshifting, and oil temperature.

While the released pressure is reduced by monitoring the second predetermined timer value T2 in the illustrated embodiment, the actual gear ratio may be monitored instead so that the released pressure is reduced at the moment when the actual gear ratio varies from the gear ratio of the gear position established before the downshifting.

While the second predetermined timer value T2 and third predetermined timer value T3 are given as fixed values in the illustrated embodiment, these timer values T2, T3 may be compensated using a learning function, by comparing gear ratios or rate of change in gear ratios each time the pedal-depressed downshifting is effected, so as to assure high shifting quality without being influenced by variations or chronological changes in the system.

What is claimed is:

1. A downshift control device for an automatic transmission wherein the transmission is shifted down to a lower gear position to be established after downshifting by releasing an oil pressure from a first engaging element that has been engaged in a higher gear position established before the downshifting while applying an oil pressure to a second engaging element that has been released in the higher gear position, said downshift control device comprising:

pedal-depressed downshifting determining means for determining whether a downshift command is generated to shift down the automatic transmission while an accelerator pedal is being depressed;

gear ratio detecting means for detecting a gear ratio that changes during pedal-depressed downshift control;

a first control actuator for controlling the oil pressure of the first engaging element;

a second control actuator for controlling the oil pressure of the second engaging element;

downshift released pressure control means for outputting to said first control actuator a command to increase the pressure of said first engaging element in a later period of shifting, and a command to reduce the pressure of the first engaging element in a terminal period of shifting, said later period of shifting starting at a point of time when the detected gear ratio reaches a first predetermined gear ratio and ending when a predetermined time expires, said terminal period of shifting starting upon a lapse of said predetermined time; and downshift applied pressure control means for outputting to said second control actuator a command to reduce the pressure of said second engaging element until the detected gear ratio reaches a second predetermined gear ratio that is larger than said first predetermined gear ratio and is lower than a third predetermined gear ratio to be obtained after shifting, and a command to increase the pressure of said second engaging element after a point of time when the detected gear ratio reaches said second predetermined gear ratio;

wherein said downshift released pressure control means outputs a command to increase the pressure of said first engaging element to said first control actuator in an initial period of shifting, and outputs a command to reduce the pressure of the first engaging element to the first control actuator in a middle period of shifting, said initial period of shifting starting when said downshift command is generated and ending when a second predetermined time expires or the detected gear ratio starts being changed, said middle period of shifting following said initial period of shifting and ending when the detected gear ratio reaches said first predetermined gear ratio.

2. A downshift control device for an automatic transmission as defined in claim 1, further comprising:

a first accumulator provided in an oil path that leads to said first engaging element that is to be released upon downshifting;

a second accumulator provided in an oil path that leads to said second engaging element that is to be engaged upon downshifting;

wherein said first control actuator controls the pressure of said first engaging element by controlling an oil pressure in a back pressure chamber of said first accumulator, and said second control actuator controls the pressure of said second engaging element by controlling an oil pressure in a back pressure chamber of said second accumulator.

* * * * *